United States Patent [19]

Heesen

[11] 4,179,257

[45] Dec. 18, 1979

[54] PRESS

[76] Inventor: Theodorus J. Heesen, Selissen 6, Boxtel, Netherlands

[21] Appl. No.: 876,943

[22] Filed: Feb. 10, 1978

[30] Foreign Application Priority Data

Feb. 11, 1977 [NL] Netherlands ........................ 7701448

[51] Int. Cl.² ................................................ B29C 3/00

[52] U.S. Cl. .......................... 425/331; 425/DIG. 230

[58] Field of Search ............... 425/214, 310, 331, 315, 425/DIG. 230

[56] References Cited

U.S. PATENT DOCUMENTS

| | | | |
|---|---|---|---|
| 2,614,290 | 10/1952 | Street | 425/311 |
| 3,010,150 | 11/1961 | Meakin | 425/331 |
| 3,191,227 | 6/1965 | Keefe | 425/331 |
| 3,581,678 | 6/1971 | Landers | 425/331 X |
| 3,932,091 | 1/1976 | Fink | 425/331 |

*Primary Examiner*—Robert L. Spicer, Jr.
*Attorney, Agent, or Firm*—Hubbell, Cohen, Stiefel & Gross

[57] ABSTRACT

A press for compressing powdery material in which a single roller is rotatably mounted eccentrically within a perforated annular mould. This permits a single roller of relatively large diameter to be employed to apply pressure to the powdery material.

10 Claims, 1 Drawing Figure

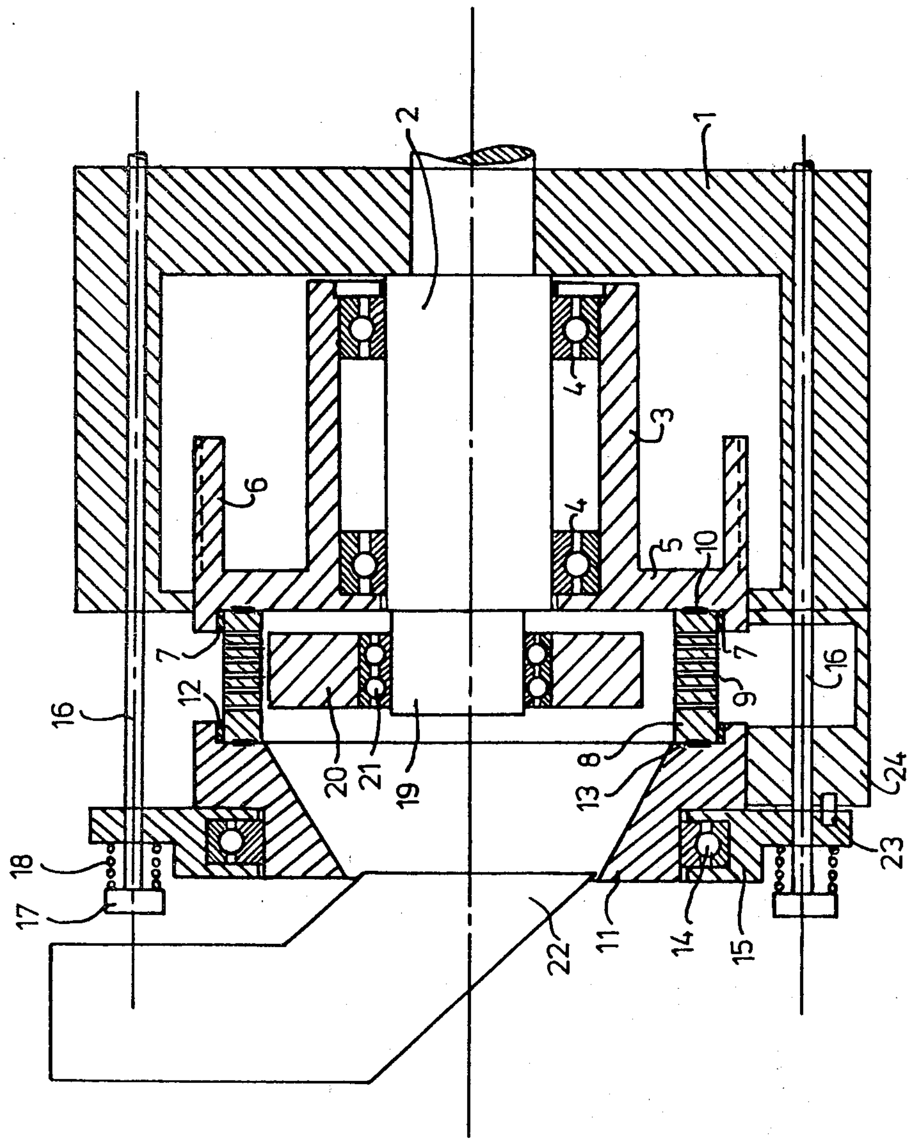
1
2
3
4
4
5
6
7
7
8
9
10
11
12
13
14
15
16
16
17
18
19
20
21
22
23
24

PRESS

The invention relates to a press for compressing powdery material into granular material of the kind comprising a rotatable, annular, perforated mould supported by a drivable mould holder, the mould having inside it a roller adapted to rotate about a stationary shaft.

Such a press is known from Dutch Pat. application No. 6705226.

For compressing powdery material into granular material it is most advantageous to use a press comprising a single pressing roller, since various advantages can thus be obtained. When only one roller is employed, for example, the feed of the product to be compressed can be carried out in a simple manner. The circumferential speed of the mould is not subjected to special requirements since the material can always be fed at a suitable area and a satisfactory distributions of the material does not need to utilise centrifugal force.

The diameter of the roller may be large so that the pressure on the material can be progressively built up over a comparatively great length and for a comparatively long time. This is important in allowing for the comparatively large quantity of air contained in the powdery material to escape. If the air cannot escape to a sufficient extent, the granular products obtained by pressing may tend to disintegrate.

Despite all advantages inherent in the use of a press having only one pressing roller, in practice substantially all prior presses have a plurality of pressing rollers because of the difficulty in supporting the mould. Conventional constructions allow a supporting bearing to be located on only one side of the mould and furthermore, during operation, as a result of the prevailing pressures, the mould tends to turn with respect to the mould holder and, in particular, to lead with respect to the mould holder. These problems are discussed in the aforesaid Dutch patent application No. 6705226 and in order to obviate them it has been proposed to use wedge-shaped clamping members. However, this involves many difficulties in mounting and dismounting the mould, and the problems concerning unilateral support bearings are not solved.

The invention has for its object to provide a press having a construction of the kind set forth above, which can provide an effective structure when equipped with one roller, while the disadvantages occurring in the use of the constructions hitherto proposed for presses operating with one roller are avoided.

According to the invention a press for compressing powdery material into granular material comprises a rotatable, annular, perforated mould supported by a drivable mould holder, and a roller arranged to rotate about a stationary shaft and located within said mould, the side of the mould remote from the mould holder being supported by a supporting member which urges the mould and the mould holder against one another in an axial direction so that the mould will be rotated by the mould holder as a result of the frictional forces between the mould and the mould holer.

When the device is started, the mould will be carried along as a result of the frictional forces between the mould and the mould holder and during operation the mould will continue to rotate, since as stated above the mould tends to lead with respect to the mould holder.

It is, in addition possible in this case to support the mould on both sides by journalling the support member so as to be rotatable.

The invention is now described more fully with reference to the accompanying drawing which schematically illustrates one embodiment of press in accordance with the invention.

The press comprises a supporting body 1 in which a stationary shaft 2 is arranged on which a hub 3 is freely rotatable in bearings 4. At one end the hub 3 is provided with a flange 5 integral with said hub and connecting the hub 3 with a rim 6 extending to either side of the flange 5. Around the righ-hand outer part of the rim 6, as seen in the drawing, can be passed a toothed belt or the like (not shown) by means of which the rim and the hub 3 can be rotated about the shaft 2.

At the inner side of the left-hand part of the rim 6 as seen in the drawing is arranged a ring 7 of a hard metal or a similar wear-resistant material for supporting a mould 8 located inside said ring and having passages 9. Preferably a ring 10 formed of material having a high friction coefficient is arranged between the side of the annular mould 8 facing the flange 5 and the flange 5.

On the side remote from the flange 5 the annular mould is accomodated in a recess in an annular supporting member 11, in which recess a ring 12 of wear-resistant material, preferably similar to that of the ring 7, is arranged for supporting the associated end of the annular mould. An annular member 13 formed of material having a high friction coefficient, preferably similar to that of the annular member 11, is arranged between the radial surface of the recess in the supporting member 11 and the end of the mould 8 extending parallel to said surface.

With the aid of a bearing 14 the supporting member 11 is rotatably journalled in a supporting plate 15. The supporting plate 15 is connected to the body 1 by means of a plurality of pins or bolts 16 extending parallel to the axis of the shaft 2, the ends of the pins 16 remote from the body 1 being provided with heads 17, compression springs 18 being arranged between said heads 17 and the supporting plate 15 for urging the mould 8, through the supporting member 11, firmly against the flange 5. Instead of the compression springs 18, hydraulic or pneumatic rams may be used for producing sufficient force acting in an axial direction to press the supporting ring 11 against the mould 8 and to press the mould 8 against the flange 5.

From the drawing it will be seen that the shaft 2 is provided with a stub shaft 19, which is eccentric with respect to the axis of the shaft 2 and about which a pressing roller 20, co-operating in known manner with the mould 8, is freely rotatable in a bearing 21.

The device also comprises a feeding funnel 22 for the supply of material to be compressed to the mould 8 through a passage defined by the annular supporting member 11.

When during operation the mould holder formed by the hub 3, the flange 5 and the rim 6 is rotated, the mould 8 and, through the mould 8, the annular supporting member 11 will be rotated as a result of the frictional forces generated between said parts. When subsequently material is fed in, it will be compressed in known manner by the roller 20 having a large diameter as compared with the inner diameter of the mould. As stated above, as a result of the pressure exerted on the mould 8, the mould tends to slightly lead with respect to the mould holder during operation so that there is no risk of the mould 8 not maintaining its rotation in the appropriate manner. The forces exerted on the mould 8 are effectively absorbed by the bearings 4 and 14 arranged one on each side of the mould 8 and so undesirably high bending forces will be exerted on the mould support.

Turning of the supporting plate 15 of the supporting member 11 is prevented by means of pins 23 located at one end in openings in the plate 15 and at the other end in openings provided in a collecting trough 24 for the compressed material, secured to the body 1.

The removal of the mould 8 for replacement or the like can be simply carried out, by the bolts or rods 16 being arranged so as to be readily slidable in their lengthwise direction with respect to the supporting body 1, for example, by connecting said rods 16 with a slide or the like disposed on the right-hand side of the body 1, as seen in the drawing, and being displaceable in the direction of length of the rods 16. If it is desired for the mould 8 to remain in the mould holder when the supporting ring 11 is displaced to the left, as seen in the drawing, for dismounting the mould 8, it may be useful to provide compression springs in recesses in the supporting ring 11 loading the left-hand side of the mould 8. If it is desired for the mould 8 to move together with the ring 11, such compression springs may be arranged in bores provided at appropriate places in the flange 5.

What I claim is:

1. A press for compressing powdery material into granular material, comprising a rotatable, annular, perforated mould, a drivable mould holder supporting said mould, a stationary shaft located within said mould eccentrically of the longitudinal axis of said mould, a roller rotatably mounted on said shaft within said mould, a supporting member for supporting the side of the mould remote from the mould holder, said supporting member urging the mould and the mould holder against one another in an axial direction so that the mould will be rotated by the mould holder as a result of the frictional forces between the mould and the mould holder.

2. A press as claimed in claim 1 wherein the supporting member is rotatably supported.

3. A press as claimed in claim 2, further comprising material having a high friction coefficient located between the sides of the mould and the mould holder and between the sides of the mould and the supporting member.

4. A press as claimed in claim 1 further comprising material having a high friction coefficient located between the sides of the mould and the mould holder and between the sides of the mould and the supporting member.

5. A press as defined in claim 1, wherein said mould holder and said supporting member are provided with recesses and the outer circumference of said mould is disposed in said recesses.

6. A press as claimed in claim 5, further comprising rings of hard material arranged between outer parts of the mould and the mould holder and the supporting member and supported by the mould holder and the supporting member respectively.

7. A press as claimed in claim 6, further comprising springs urging the supporting member and the mould towards the mould holder.

8. A press as claimed in claim 7, wherein said springs are arranged between the supporting member and the mould for pushing the supporting member and the mould away from one another when the mould ceases to be urged towards the mould holder.

9. A press as defined in claim 7, wherein said springs are arranged between said mould holder and said mould for pushing said mould and said mould holder away from one another when said mould ceases to be urged towards said mould holder.

10. A press as defined in claim 9, wherein said springs are arranged between said mould holder and said mould for pushing said mould and said mould holder away from one another when said mould ceases to be urged towards said mould holder.

* * * * *